B. D. HORTON AND W. P. HAMMOND.

ELECTRICAL SWITCH.

APPLICATION FILED MAR. 20, 1919.

Reissued Aug. 31, 1920. 14,942.

Bryson D. Horton, INVENTORS

William P. Hammond.

By Wilford E. Dunn

ATTORNEY

UNITED STATES PATENT OFFICE.

BRYSON D. HORTON, OF DETROIT, MICHIGAN, AND WILLIAM P. HAMMOND, OF PASSAIC, NEW JERSEY; SAID HAMMOND ASSIGNOR TO SAID HORTON.

ELECTRICAL SWITCH.

14,942. Specification of Reissued Letters Patent. Reissued Aug. 31, 1920.

Original No. 1,187,911, dated June 20, 1916, Serial No. 826,843, filed March 24, 1914. Application for reissue filed March 20, 1919. Serial No. 283,931.

*To all whom it may concern:*

Be it known that we, BRYSON D. HORTON and WILLIAM P. HAMMOND, citizens of the United States, residing at Detroit, in the county of Wayne and State of Michigan, and at Passaic, in the county of Passaic and State of New Jersey, respectively, have invented certain new and useful Improvements in Electrical Switches, of which the following is a full, clear, and concise description thereof, such as would enable others skilled in the art to which the invention appertains to make and use the same, reference being had to the accompanying sheets of drawings, which form a part hereof.

Our invention particularly relates to certain improvements in that type of electrical switches commonly referred to as protected or armor-clad. In switches of this type, the operable parts of the switch mechanism are housed within a metal casing, the stationary contacts usually being mounted upon the base of the casing, while the parts carrying the movable contacts are reciprocably mounted therein and operated by an exterior crank journaled in the side of the casing. The moving parts of the switch mechanism, in these prior art switches are operated independently of any opening movement imparted to the cover of the receptacle, that is to say, the throwing off of the knife contacts is not dependent upon the opening of the cover but requires manipulation independent thereof.

One of the objects of our present invention is to provide means whereby the movement of the movably mounted knife contacts of the switch may be incident upon the opening of the cover of the receptacle so as to assure the breaking of the electrical circuit when access is being had to the interior of the receptacle. In this way we eliminate the possibility of exposing the live metal parts to the hand of the operator through carelessness or thoughtlessness on his part when manipulating the switch and thereby minimize life hazard.

Another object of our invention is to provide means whereby the closing of the switch mechanism may be incident upon the closing of the cover of the receptacle.

The mechanism which we have devised for carrying out the above objects combines the additional feature of permitting the manipulation of the switch mechanism independently of the cover movement so that when the cover is sealed closed the switch may be thrown "on" or "off" by means of the exterior operating crank.

In the accompanying drawings we have illustrated by way of example, a suitable embodiment of our invention in which Figure 1 illustrates in vertical cross-section an armor clad switch, partly in section, the switch contacts being in their "on" position and the cover carrying actuating latch mechanism in its normal coöperative position.

Figure 1:
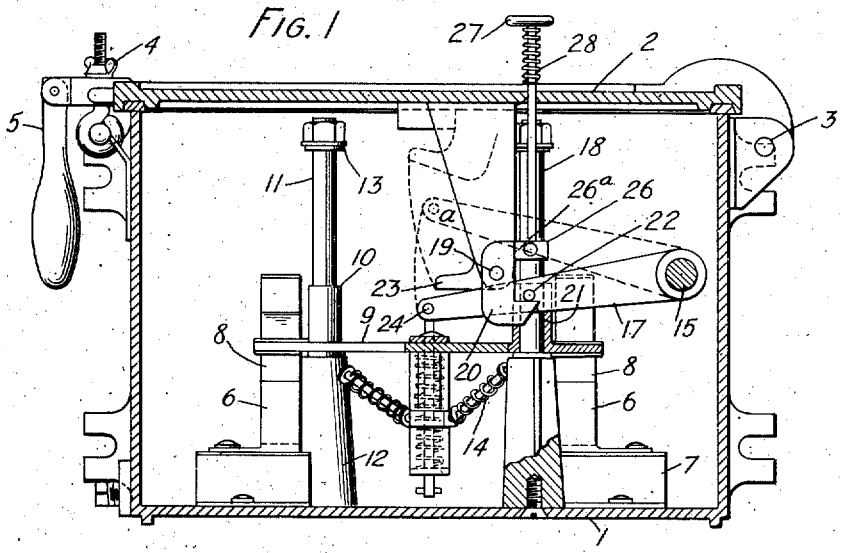
Figure 3:
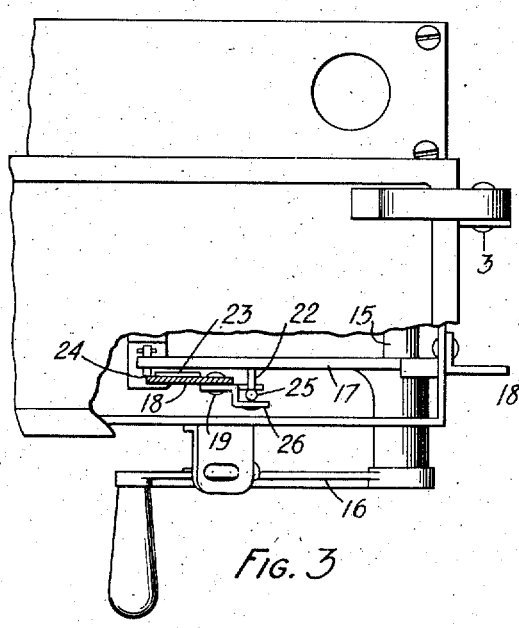
Fig. 3 is a top plan view partly broken away, showing in longitudinal section the cover carrying latch mechanism in the position shown in Fig. 1.
Figure 2:
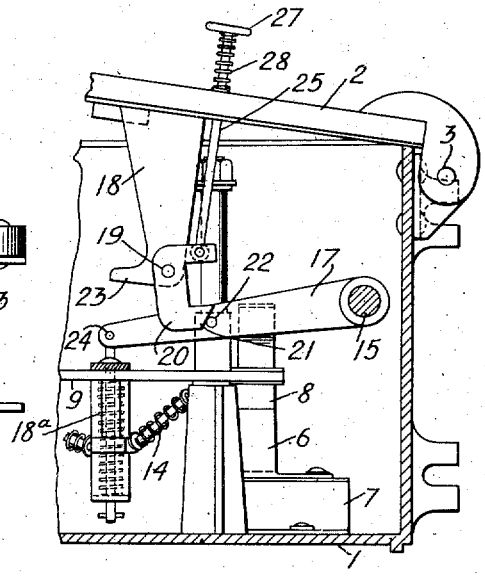
Fig. 2 is a fragmentary detail of the same mechanism showing the cover carrying latch mechanism after it has been operated to release the cover from the switch mechanism, the cover being partly opened and in position to be fully opened independently of operating the switch mechanism.

In detail, 1 indicates the casing, which is provided with a cover 2, the latter being hinged at 3. The casing and cover are provided with a convenient securing means 4. At the point where the securing means 4 is located, the cover is provided with a handle 5, by means of which a good purchase may be had by the hand of the operator, when it is desired to throw the switch "off" simultaneously with opening the cover. This handle 5 for compactness and convenience may be pivotally mounted so that it may be folded downwardly as shown.

The switch mechanism may consist of a pair of suitable stationary jaw contacts 6 mounted upon a base of insulating material 7, which in turn are mounted rigid upon the bottom of the casing 1. Coöperating with these jaw contacts are a pair of knife blade contacts 8, connected by a cross-head 9, and mounted to reciprocate as the switch is thrown "on" or "off." To provide for this reciprocation, the cross-head 9 is provided with a pair of sleeves 10, which surround and reciprocate along a pair of guide rods 11 mounted at their lower ends in the insulating bases 12, and provided at their opposite ends, with limiting stops 13. As it is desirable to effect a quick make and break between the contacts, we provide an accelerating mechanism 14, which need not be particularly described other than to say that the spring energy of the springs is expended to move the movable contacts rapidly as they approach or leave the stationary contacts. No specific claim is made herein for this accelerating feature. In order to operate the switch, a rock shaft 15 is journaled in the side of the casing 1 and has connected thereto exterior of the casing, a suitable operating crank 16. The rock shaft is provided with a pair of arms 17 which have operable connection with the cross-head 9. This connection is a yielding connection indicated at 18[a] and one which serves to further accelerate the make and break movement between the switch contacts. This need not be particularly described either as it forms no part of the present invention.

We will now proceed to describe the mechanism by which the cover and switch mechanism are coöperatively associated. Formed integral with or mounted upon the lower side of the cover 2 of the receptacle is a rigid depending member 18, upon the free end of which is pivotally mounted at 19 a trigger member 20. This trigger is provided with a foot 21 which coöperates with a pin or projection 22 fast upon and carried by one of the arms 17. When the mechanism is in the position shown in Fig. 1 and the cover of the receptacle closed, the foot 21 is beneath the pin 22, so that as the cover is raised, the trigger 20 causes the switch arm 17 to inaugurate its circuit breaking movement. The coöperative engagement beneath the foot 21 and pin 22 continues until the accelerating springs 14 and their associated connecting devices pass their longitudinal or dead center position, whereupon the arm 17 is given a very rapid movement. When this occurs, the pin 22 passes from the path of movement of the foot 21 owing to the different arcs which these two members transcribe in their movements, thus clearing or freeing themselves from each other. The throwing off of the switch mechanism is accomplished simultaneously with the opening of the cover of the receptacle, so that there is no possibility of an ignorant laborer or unthinking person coming in contact with the live metal parts of the switch.

In order to provide for the closing of the switch and make this closing movement incident upon the closing of the cover of the receptacle, a foot or projection 23 is provided. This may, if desired, be formed integral with the depending member 18. This foot 23 coöperates with the pin or projection 24, the latter being the connecting pivot point of the arm 17 with the accelerating mechanism heretofore mentioned. It is obvious from the indicated arcs or paths of relative movements of the foot 23 and pin or projection 24, in the operation of the device, that the foot 23 as it descends when the cover is closing will engage the projection 24, (when in the dotted line position *a*) and will cause arm 17 to descend. The engagement of the foot 23 and projection 24 continues until the springs of the accelerating mechanism 14 move past their dead center line or longitudinal position. When this occurs, the movement of the arm 17 continues under the power of the expanding springs. This movement being rapid carries the projection 24 away from the descending foot 23. During this closing movement, the foot 20 moves in transcribing its arc into the position shown in Fig. 1 beneath the projection 22.

When the switch mechanism is in the position shown in Fig. 1 with the cover closed, the same may be freely operated to make or break connection between the contacts by operating the crank 16. The foot 23, it will be noted, is out of the vertical path of movement of the projection 24 and the projection 22 moves past and inwardly of the extension 26 as the latter is curved outwardly at 26[a] to permit of this.

In case it should be desired to open the cover of the receptacle without throwing the switch mechanism off, a means for doing so is shown. This means may comprise a plunger 25 reciprocally mounted in the receptacle cover 2. The lower end of this plunger has a pivoted connection with the projection 26 formed as an integral part of the trigger 20.

27 indicates a knob or hand piece upon the end of the rod 25 and interposed between this knob and the top of the casing is a spiral compression spring 28 which bears with tension on these parts, tending normally to hold the pivoted trigger 20 in its indicated position in Fig. 1. It is apparent that upon a depression of the rod 25, the trigger 20 is caused to oscillate upon its pivot 19. During this oscillation the foot 21 is caused to move free of the projection 22 so that the lid of the cover may be raised, while the switch mechanism remains in its "on" position. When the cover is closed, the angular face 29 of the trigger 20 engages the pin or projection 22. In this engagement, the trigger 20 is caused to oscillate, so that under continued downward pressure, the angular face 29 rides past the pin 22 and snaps into its normal position shown in Fig. 1.

The mechanism which has been just described, for the purpose of allowing the cover to be opened without throwing the switch mechanism off, is not our joint invention, and we therefore make no claim to this mechanism as a joint invention.

We claim:

1. In combination with a housing provided with a hinged cover, a switch mechanism therein including movable and stationary coöperating contacts, means for freely operating the switch mechanism to make or break the circuit without opening the receptacle and switch actuating devices carried by the cover normally engaging the switch mechanism whereby the switch mechanism is thrown to its "off" position during the opening movement of the cover, and means for closing said switch during the closing movement of the cover.

2. A switch mechanism including a metallic housing provided with a hinged cover, a switch mechanism therein, comprising stationary and movable coöperating contacts, a cross-head connecting said movable contacts, a rock-arm connected with said cross-head, a latch mechanism carried by the cover coöperating with said cross-head whereby the switch mechanism may be operated to make or break connection without opening the cover and whereby said switch mechanism may be automatically operated to make or break the circuit when the cover is opened or closed as the case might be.

BRYSON D. HORTON.
WILLIAM P. HAMMOND.